(12) United States Patent
Nevranmont

(10) Patent No.: US 6,343,303 B1
(45) Date of Patent: Jan. 29, 2002

(54) METHOD OF DETERMINING A SCALING FACTOR

(75) Inventor: Adam Nevranmont, Nepean (CA)

(73) Assignee: Mital Corporation, Kanata (CA)

( * ) Notice: Subject to any disclaimer, the term of this patent is extended or adjusted under 35 U.S.C. 154(b) by 0 days.

(21) Appl. No.: 09/314,104

(22) Filed: May 19, 1999

(30) Foreign Application Priority Data

May 20, 1998 (GB) ............................................... 9810800

(51) Int. Cl.[7] ................................................. G06F 7/00
(52) U.S. Cl. ........................................................ 708/208
(58) Field of Search ............................. 708/208, 200; 341/99

(56) References Cited

U.S. PATENT DOCUMENTS 4,335,372 A * 6/1982 Augderheide et al. ...... 708/208
4,983,966 A * 1/1991 Grone et al. ................ 708/208

* cited by examiner

*Primary Examiner*—Tan V. Mai
(74) *Attorney, Agent, or Firm*—Marks & Clerk

(57) ABSTRACT

A method of determining the scaling factor for a signed n bit binary number, where $n=2^e$, includes the steps of dividing the number into a plurality of subgroups of at least two bits each; providing a plurality of subunits holding the respective subgroups of bits; and arranging the subunits in a hierarchical tree structure of units. Each unit of a superior level receives inputs from units of a lower level, and each unit produces first, second and third output signals. The first output signal represents the most significant bit of the units in the associated hierarchy, the second signal indicates whether the bits in the associated hierarchy have the same value, and the third signal is an i-bit number representing the number of places less one that the bits in the associated hierarchy can be shifted. The index i is the same as the associated level in the hierarchy.

10 Claims, 2 Drawing Sheets

US 6,343,303 B1

METHOD OF DETERMINING A SCALING FACTOR

FIELD OF THE INVENTION

This invention relates to a method and circuit for determining a scaling factor of signed binary numbers.

BACKGROUND OF THE INVENTION

In digital signal processing applications, especially in fixed point operations, for example, in speech compression techniques, it is often necessary to determined how much a binary number can be scaled without causing a register overflow. It is convenient for the purposes of explanation to consider the decimal case. Consider a register capable of holding five decimal digits. The problem would be to determine how many times a number, say 275 could be scaled up without causing the register to overflow. In the decimal case, the answer would be 10 (10×250=2,500<10,000). In binary notation, since multiplication is equivalent to a shift to the left, for a positive number the problem essentially is one of determining the number of leading zeros. The problem is complicated by the fact that the binary numbers are assumed to be signed binary numbers, in which case the problem becomes how to determine the number of identical leading bits minus 1.

In signed binary numbers the most significant bit (MSB) indicates the sign of the number. A 1 indicates a negative number and a 0 indicates a positive number. In the case of a positive number, the magnitude is the same as the magnitude of the signed number. In the case of a negative number, the magnitude is the 1's complement of the number plus 1.

For example, the number 00001111 has a value of plus 15 in decimal notation. It can be scaled by three bits to 01111000 or decimal plus 240 without losing the sign information. If it were scaled one more place to the left, the sign information would changed and it would become a totally different number. Similarly, the number 11111110 is actually −2. It can be scaled 5 bits to the left without losing sign information to arrive at the number 11000000 or decimal −192.

It is desirable to incorporate this service into a digital signal processor. While the number of leading identical bits less one can be determined by cycling through the number, in the case of a 32 bit number this could involve up to 30 instruction cycles, which consumes substantial processor time.

An object of the invention is to provide a more efficient method of determining the scaling factor of a signed binary number.

SUMMARY OF THE INVENTION

According to the present invention there is provided a method of determining the scaling factor for a signed n bit binary number, where $n=2^e$, comprising the steps of dividing the number into a plurality of subgroups of at least two bits each; providing a plurality of subunits holding said respective subgroups of bits; and arranging said subunits in a hierarchical tree structure of units, with each unit of a superior level receiving inputs from units of a lower level, each unit producing first, second and third output signals, said first output signal representing the most significant bit of said units in the associated hierarchy, said second signal indicating whether the bits in the associated hierarchy have the same value, and said third signal being an i-bit number representing the number of places less one that the bits in the associated hierarchy can be shifted, the index i being the same as the associated level in the hierarchy.

An analysis of this scheme shows that the exponent value, which is given by the value of the third signal at the top level of the hierarchy, can be arrive at in e +1 gate delays. In the case of a 32-bit number, the answer is arrived therefore in six gate delays, which represents a considerable improvement over the prior art.

The invention also provides a circuit for determining the scaling factor for a signed n bit binary number, where $n=2^e$, comprising a register for storing said number, said register being divided into a plurality of subunits of at least two bits each; and a hierarchical tree structure of units with said subunits forming the lowest level thereof, and each unit of a superior level receiving inputs from units of a lower level, each unit producing first, second and third output signals, said first output signal representing the most significant bit of said units in the associated hierarchy, said second signal indicating whether the bits in the associated hierarchy have the same value, and said third signal being an i-bit number representing the number of places less one that the bits in the associated hierarchy can be shifted, the index i being the same as the associated level in the hierarchy.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
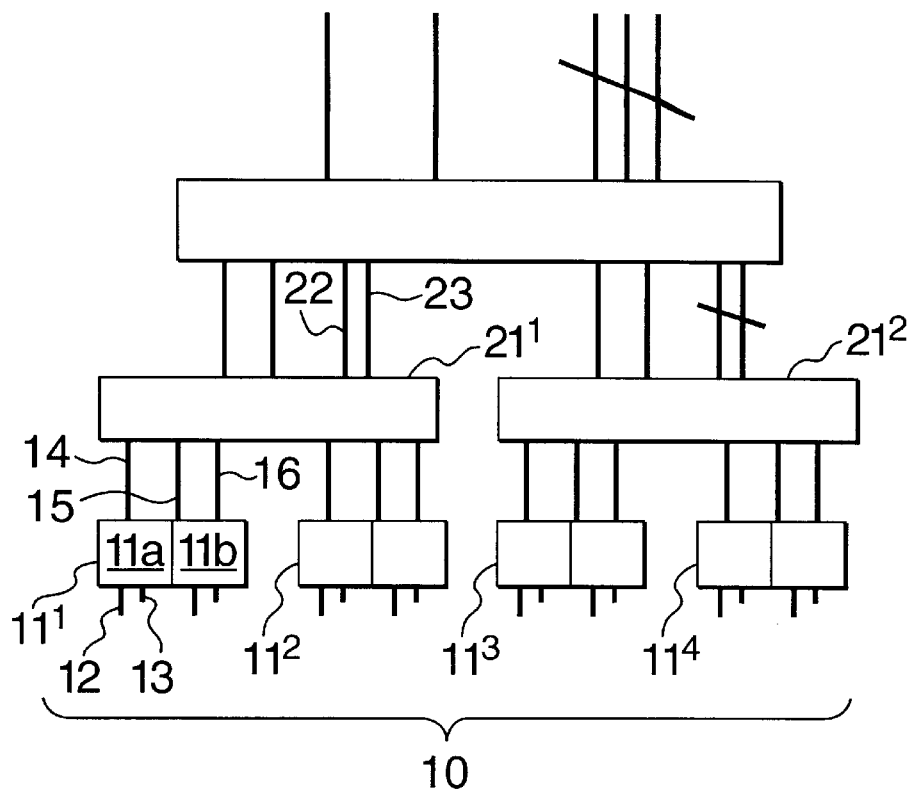
FIG. 1 is a block diagram of portion of a hierarchical logic circuit for implementing one embodiment of the invention.
Figure 2:
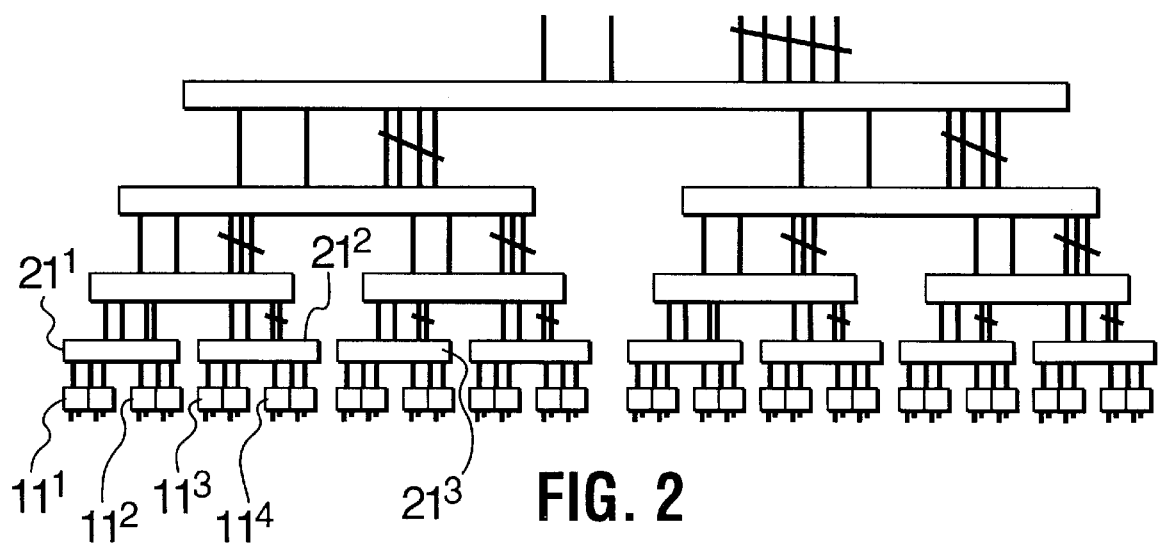
FIG. 2 shows a more complete representation of the hierarchy of FIG. 1.

Referring now to FIGS. 1 and 2, a 32-bit signed binary number is loaded into register 10. The binary number is represented in the usual manner with the leftmost bit being the most significant and representing the sign of the number. The object is to determine the number of identical leading bits less one and express this value as a five bit binary number ($2^5=32$). Since a shift to the left represents a multiplication operation, this value represents the amount by which the 32-bit number can be scaled without destroying the sign information.

The register 10 is divided into eight pairs of subunits $11^1$, $11^2$; etc, each containing a pair of cells 11a, 11b containing respective bits.

Each cell 11a, 11b has a pair of inputs 12, 13. The first input 12 receives the bit forming part of the 32-bit number and the second input 13, for this first level is tied to a fixed value, in this case 1.

Each subunit has three outputs, 4, 15, 16. The first output 14 represents the most significant bit (MSB) of the two cells 11a, 11b, which is the leftmost bit, i.e. the bit in cell 11a. The second output 15 represents the ALL value of the two cells. ALL is 1 if all bits in the subunit are the same. In the case of subunit $11^1$, the $ALL^1$ output is 1 if the bits in cells 11a, 11b are the same, i.e. an exclue NOR operation is performed on the bits.

In this case, the two bits consist simply of $MSB^1$ and $MSB^2$. The result is that output 15=NOT ($MSB^1$ and $MSB^2$).

For reasons of uniformity of design, the cells $11^a$, $11^b$ have second inputs 13 that are tied to 1 and ANDed with the results of the exclusive NOR operation on the inputs 12. In this lowest level, the presence of the inputs 13 does not affect the outcome of the logic operation. However, as one moves up the hierarchy the AND operation ensures that ALL is only high if all the bits lower down the hierarchy are the same. One of the advantages of the invention that make it suitable for integration is that it can be made out of identical building blocks. In this case of the lowest level, inputs 13 are essentially dummy inputs.

The third output 16 of the subunits $11^1$, $11^2$ is a 1-bit number (VAL) representing the number of leading identical bits less one that the segment of the number represented by this branch of the hierarchy. In this case, it is 1 for subunit $11^1$ (which contains the number 1,1), and zero for subunit $11^2$ (which contains the number 1,0).

The number VAL is the sum of the input VALs (0 in this case) for each subunit plus 1 when ALL is high. If ALL is low, VAL is the same as for the most significant unit in the previous level of the hierarchy because the additional block does not allow any extra shifts with the possible exception of the MSB if the MSB of the added block is the same as the bits in the previous block. Thus, if the number in subunit $11^1$ were 1,0, $ALL^1$ would be zero and so would $VAL^1$.

Moving on now to the next level up in the hierarchy, units $21^1, 21^2, 21^3, 21^4$ etc. receive inputs from pairs $11^1, 11^2$; $11^3$, $11^4$ etc. Being the second level encoding for four bits, the units $21^1, 21^2$, etc. have single bit outputs 22, 23, representing the MSB and ALL signals, and 2-bit outputs 24 representing the VAL signals. The inputs $25^1, 26^1, 27^1$; $25^2, 26^2$, $27^2$, receives the outputs 14, 15, 16 respectively from the lower level units $11^1$, $11^2$.

The output 22 is simply the most significant bit, which is propagated up from the previous level. The output 23 is the result of ANDing the ALL outputs 15 of the subunits $11^1$, $11^2$ and ANDing this result with an exclusive OR operation performed on the MSBs of the lower level, i.e. outputs 14. The ALL output 22 is high if all the bits lower down in the hierarchy are the same. For example, in the case given (1,1,1,0), ALL (22) will be low.

The outputs can be given mathematically as follows:

MSB (22)=$MSB^1$, (output 11 of subunit $11^1$) (1)

The MSB output is always set to the leftmost bit of the segment. In the example given (where the bits in subunits $11^1$, $11^2$ are 1,1,1,0), MSB (output 22) is 1.

ALL (output 23)=$(MSB^1$^$MSB^2)$ & $ALL^1$ & $ALL^2$, (2)

where the superscripts correspond to the unit numbers.

In the example, ALL (output 23) should be zero because not all four bits lower down in the hierarchy (1,1,1,0) are the same. Following equation 2, $ALL^1$ & $ALL^2$=1 & 0=0, $(MSB^1$^$AMSB^2)$=1^1=0, and therefore ALL (output 23 )=0, indicating that not all lower bits lower down in thee hierarchy are the same. Since ALL=0, the output 24 is the same as the output 16 in level form except expressed as a two bit number to allow for the possibility that it might be greater than 1. In this case, output 16 is a two-bit number (0,1).

If all four bits in the lower level were the same (1,1,1,1), then ALL would be high, and VAL (24) would be the sum of the lower VALs (each=1) plus 1, i.e. 3. The number 1,1,1,1 can be shifted three bits to the left.

Although it is possible to arrive at the new value of VAL in the manner described, i.e. by taking the sum of the VALs in the preceding level plus 1 when ALL is high, and taking the highest order VAL when ALL is low, this method of computation is cumbersome. Fortunately, it can be simplified because the value (VAL) is only used when $ALL^1$ is high. This means that $VAL^1$ must be 1 (or all ones higher up in the hierarchy). Therefore $VAL^1$=1 followed by w-1 Os, where w is the width of the VAL output bus (2 in this case for level 2), so $VAL^1$+1=10. Also, $VAL^2$ is a w-1 bit number, so the addition is equivalent to using $VAL^2$ as the w-1 least significant bits of a w bit number with 1 as the most significant bit.

Consequently, VAL<w-1,0>={1, VAL0<w-2:0>}.

If the string of identical numbers does not extend beyond the highest order block, VAL=$VAL^1$, but in order to ensure that the new VAL has the correct number of bits, VAL<w-1:0 >must be set ={0,VAL1<w-2:0>}.

Thus, in the example given (1,1,1,0), VAL=1,0.

More generally, VAL[w-2:0]=NOT $((MSB^1$^$AMSB^2)$ ?$VAL^2$:$VAL^1$ VAL[w-1]=NOT $((MSB^1$^$MSB^2)$ & $ALL^1$ where X?y:z is a mux operation such that if x=1, the result is y, if x=0, the result is z.

Following the equations above for the example given,

NOT $(MSB^1$^$MSB^2)$=NOT (1^1)=1

NOT $((MSB^1$^$MSB^2)$ & $ALL^1$=1

VAL[w-2:0]=1 ?$VAL^2$:$VAL^1$

VAL[w-2:0]=1 ?0:1

VAL[w-2:0]=0

VAL[w-1]=1 & $ALL^1$=1, therefore

The output VAL 24=1,0.

If the number were 1111, $ALL^1$ and $ALL^2$=1

Therefore ALL (23)=1.

VAL[w-2:0]=NOT $((MSB^1$^$MSB^2)$?$VAL^2$:$VAL^1$

VAL[w-2:0]=NOT (1^1)?$VAL^2$:$VAL^1$

VAL[w-2:0]=1 ?$VAL^2$:$VAL^1$

VAL[w-2:0]=1

VAL[w-1]=1 & $ALL^1$=1, therefore

VAL[w-1]=1 and

VAL(24)=11.

It can easily be seen that for a number 1,1,0,0

VAL[w-2:0]=NOT (1^0)?$VAL^2$:$VAL^1$

VAL[w-2:0]=$VAL^1$=1 and

VAL[w-1]=0 & $ALL^1$=0, therefore

VAL (24)=01 and for a number 1,0,0,0

VAL[w-2:0]=NOT (1^0)?$VAL^2$:$VAL^1$

VAL[w-2:0]=$VAL^1$=0 and

VAL[w-1]=0 and

This scheme propagates up the hierarchy so that the output VAL at the fifth level is a five bit number giving the number of leading bits less one.

The real advantage of the invention becomes apparent with a timing analysis. As each unit requires three gate delays to fully calculate its VAL bus, it would initially appear that the design would require 3*lg(n) gate delays to calculate the result. Closer examination shows that this value is significantly less.

Calculation of the signal $((MSB^1$^$MSB^2)$ & $ALL^1)$ takes only two gate delays, as does the calculation of the ALL signal output as does calculating the ALL signal output. After MSBs are available, calculation of that signal takes only 1 gate delay, as does the calculation of the ALL signal. After that signal is calculated, it takes only 1 additional gate delay build the VAL bus. Note that MSBs are available immediately, as no logic is required for them since they merely propagate through the hierarchical structure.

Another improvement deals with simplifying the width-1 VAL bus circuit. Since it is known that the input ALL signals are 1 (if the output VAL is different from the input VAL of the higher order input block), it only takes one gate delay to calculate the output ALL value and the output VAL bus (which consists only of 1 extra bit) takes only 1 gate delay, for calculating $MSB_1\char`\^MSB_2$.

Another saving involves eliminating the logic circuitry that calculates the 'ALL' signal for all of the logic-blocks that are the least significant on their level. This avoids the need to calculate the 'ALL' signal for the entire original input number.

So, with dataflow in the downward direction, the number of gate delays on each level is given in the following table:

| | Time from initial input for outputs to stabilize | | For this level | |
|---|---|---|---|---|
| Width of VAL bus | ALL | Entire VAL bus | MSB of value fan-out | Gates/ block | Number of blocks (32 bit) |
| 0 | N/a | N/a | 0 | 0 | 32 (n) |
| 1 | 1 | 1* | 1 | 1 | 16 (n/2) |
| 2 | 2 | 2 | 2 | 4 - 1/8 | 8 (n/4) |
| 3 | 3 | 3 | 3 | 4 - 1/4 | 4 (n/8) |
| 4 | 4 | 4 | 4 | 4 - 1/2 | 2 (n/16) |
| 5 | 5 | 5 | 5 | 4 - 1 | 1 (n/32) |

The fractions in the gates/block column represent the fact that one 3-input and gate can be removed on each level from level 2 onward. The asterisk points out that a gate delay can be saved because no MUXing is required.

Thus

| | For a 32 bit detector | For a n-$2^e$ detector |
|---|---|---|
| Total delay | 7 gate delays | e + 1 gate delays |
| Max fan-out | 5 | e |
| Gates | 72 | (2.5)*n-3-e |
| Muxes | 15 | n/2 -1 |
| 2-input ANDs | 15 | n/2 -1 |
| 3-input ANDs | 11 | n/2 -e |
| XORs | 31 | n-1 |

Ignoring load considerations, this arrangement can calculate the exponent value of an 2^e bit value in e+1 gate delays. This requires a maximum fan-out of e (the MSB of the original input value has this fan-out), assuming the MSB output of the VAL bus e-width level is note used. If this causes a problem, only a handful of the fan-outs of the MSB are required immediately, and buffers can be used to boost the rest.

Note that, for the sake of simplicity, it has been assumed 2- and 3-input AND gates, mux's and XOR gates have the same gate delay, which is not true in practice. The XOR only contributes 1 gate delay to the timing analysis, while the remaining delay is shared between the mux, and 2- and 3- input and gates.

An important part of this process is the 'ALL' signal, which significantly speeds up the calculation time, as well as the use of a binary tree architecture in the detection of an exponent (merging 2 signals that encode the exponent-data for a part of the value into a signal that encodes. Since the block correctly merges the data from the 2 sub blocks, and it works on only 1 bit, it can be deduced that it will produce a correct result for a tree of any height.

In an alternative embodiment, it is possible to eliminate the ALL signal and generate it at each step by using two zero detectors and an inverter on the VAL bus. However, this significantly increases both the delay of the module and the number of gates required.

Figure 3:
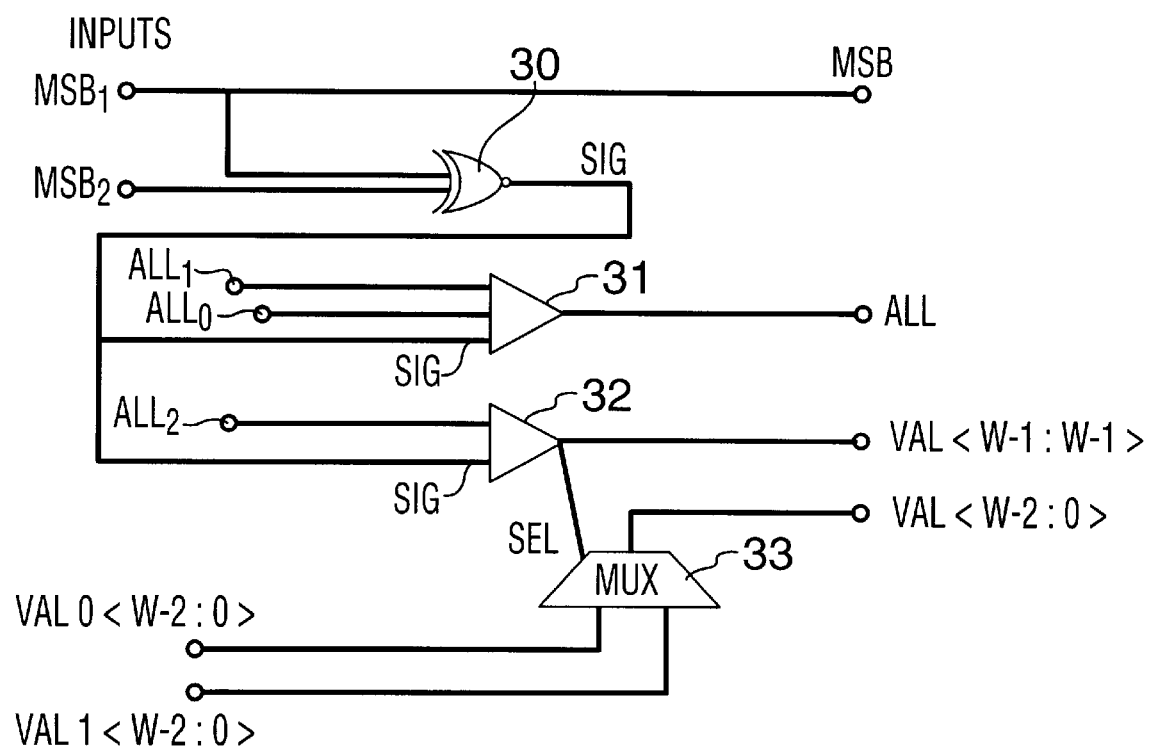
FIG. 3 is a diagram of the logic circuitry.

FIG. 3 shows a practical implementation of the logic circuitry in each unit. Input $MSB_1$, which is the leftmost bit of each number segment is passed straight through to the output.

$MSB_1$ and $MSB_2$ are passed though exclusive NOR gate to generate an output signal (SIG), which serves as on input to AND gates 31, 32. AND gate 31 has $ALL_1$ and $ALL_2$ as its other inputs and produces the output ALL for the next level up in the hierarchy. $ALL_1$ and $ALL_2$ are the input ALL signals from the previous level in the hierarchy.

AND gate 32 has as its other input signal $ALL_1$, which is the ALL signal from the leftmost unit (most significant) in the previous level of the hierarchy. It produces the output signal VAL<w-1:w-1>.

Mux 33 has as its select input the output of AND gate 32 and as its inputs VAL0<w-2:0> and VAL1<w-2:0>. Mux 32 generates VAL<w-2:0> in accordance with the logic described above.

For simplicity, the invention has been described in positive logic. It will be appreciated by one skilled in the art that it can equally well be implemented in negative logic. In general, using NAND instead of AND gates and modifying the signals accordingly.

I claim:

1. A method of determining the scaling factor for a signed n bit binary number, where n=$2^e$, comprising the steps of:
    a) dividing the number into a plurality of subgroups of at least two bits each;
    b) providing a plurality of subunits holding said respective subgroups of bits; and
    c) arranging said subunits in a hierarchical tree structure of units, with each unit of a superior level receiving inputs from units of a lower level, each unit producing first, second and third output signals, said first output signal representing the most significant bit of said units in the associated hierarchy, said second signal indicating whether the bits in the associated hierarchy have the same value, and said third signal being an i-bit number representing the number of places less one that the bits in the associated hierarchy can be shifted, the index i being the same as the associated level in the hierarchy.

2. A method as claimed in claim 1 wherein said first signal is propagated up the hierarchy from each level to the next most superior level.

3. A method as claimed in claim 2, wherein second signal is the result of performing an exclusive NOR operation on the first signals of the inputs in the current level of the hierarchy and performing an AND operation with the second signals in the current level of the hierarchy or the equivalent in opposite logic.

4. A method as claimed in claim 2, wherein said third signal (VAL) is the result of performing the following logic operation:

VAL[w-2:0]=NOT($MSB_1\char`\^MSB_2$) & $ALL_1$)?VAL0:VAL$_1$

VAL[w-1]=NOT($MSB_1\char`\^MSB_2$) & $ALL_1$

5. A circuit for determining the scaling factor for a signed n bit binary number, where n=$2^e$, comprising:
    a) a register for storing said number, said register being divided into a plurality of subunits of at least two bits each; and
    b) a hierarchical tree structure of units with said subunits forming the lowest level thereof, and each unit of a superior level receiving inputs from units of a lower level, each unit producing first, second and third output signals, said first output signal representing the most significant bit of said units in the associated hierarchy, said second signal indicating whether the bits in the associated hierarchy have the same value, and said third signal being an i-bit number representing the number of places less one that the bits in the associated hierarchy can be shifted, the index i being the same as the associated level in the hierarchy.

6. A circuit as claimed in claim 5, comprising circuitry for propagating the first signal up the hierarchy so that the first signal is the same for all levels.

7. A circuit as claimed in claim 6, comprising in each unit an exclusive NOR gate receiving the first signal from adjacent units at an inferior level and an AND gate for producing said second signal from the output of said exclusive NOR gate the second signal inputs from the inferior level or the equivalent in opposite logic.

8. A circuit as claimed in claim 7, comprising a multiplexer for producing said third signal from the most significant said second signal from the inferior level and the output of said exclusive NOR gate and from the third signal from the inferior level or the equivalent in opposite logic.

9. A circuit as claimed in claim 8, wherein said mulitplexer produces said third signal in accordance with the logic:

$$VAL[w-2:0] = NOT(MSB_1 \hat{} MSB_2) \text{ \& } ALL_1) ? VAL0 : VAL_1$$

$$VAL[w-1] = NOT(MSB_1 \hat{} MSB_2) \text{ \& } ALL_1$$

or the equivalent in opposite logic.

10. A digital signal processor in including a circuit for determining the scaling factor for a signed n bit binary number, where $n=2^e$ as claimed in claim 5.

* * * * *